(12) United States Patent
Lewis et al.

(10) Patent No.: US 6,737,331 B1
(45) Date of Patent: May 18, 2004

(54) FORCE SENSING DEVICES WITH MULTIPLE FILLED AND/OR EMPTY CHANNELS AND OTHER ATTRIBUTES

(75) Inventors: Aaron Lewis, Jerusalem (IL); Galina Fish, Jerusalem (IL); Rima Glazer Dekhter, Jerusalem (IL); Sophia Kokotov, Maale Adumim (IL)

(73) Assignee: Nanoptics, Inc., Jerusalem (IL)

( * ) Notice: Subject to any disclaimer, the term of this patent is extended or adjusted under 35 U.S.C. 154(b) by 126 days.

(21) Appl. No.: 10/048,980
(22) PCT Filed: Sep. 21, 2000
(86) PCT No.: PCT/US00/21978
§ 371 (c)(1),
(2), (4) Date: Feb. 19, 2002
(87) PCT Pub. No.: WO01/27581
PCT Pub. Date: Apr. 19, 2001

(30) Foreign Application Priority Data

Sep. 23, 1999 (IL) .................................................. 132021

(51) Int. Cl.[7] .......................... H01L 21/76; H01L 35/34; H01L 35/28; G21K 7/00
(52) U.S. Cl. ........................ 438/404; 250/306; 136/201; 136/203; 136/225; 136/228
(58) Field of Search ................................ 136/200, 201, 136/225, 226, 203, 228; 250/306; 438/404

(56) References Cited

U.S. PATENT DOCUMENTS 5,986,261 A * 11/1999 Lewis et al. ................ 250/306

* cited by examiner

*Primary Examiner*—Patrick Ryan
*Assistant Examiner*—Thomas H. Parsons
(74) *Attorney, Agent, or Firm*—Jones, Tullar & Cooper, P.C.

(57) ABSTRACT

A nanoscale force sensing device includes a probe having a tip with multiple isolated channels which can receive different materials. The device may be either straight or cantilevered and may be mounted to permit detection of surface forces while performing other functions at the same time.

31 Claims, 4 Drawing Sheets

FORCE SENSING DEVICES WITH MULTIPLE FILLED AND/OR EMPTY CHANNELS AND OTHER ATTRIBUTES

FIELD OF THE INVENTION

This invention is a general method for forming force sensing devices with multiple isolated channels in which two or more materials (solid, liquid or gas) can be isolated one from another. These devices have various attributes that result from this technology that can produce such devices that are either straight or cantilevered. The resulting structures, either cantilevered or uncantilevered, can be tapered to a small tip and should allow for the ability to sense surface forces while using one or multiple channels of the structure for another function.

BACKGROUND OF THE INVENTION

If there was a general method that could allow for the generation of multiple channel force sensing devices with channels, that could be filled with a solid liquid or gas or left empty or both, this would have significant impact in numerous areas of science and technology. They could form probes that could have multiple attributes such as chemical sensors in one channel with gas in another channel, micro vacuum devices with single channels that could suck up materials and air in a second channel to release such materials, unique nanometric thermocouples, micro voltage, micro capacitance, micro inductive, micromagnetic devices depending on electrical isolation or contact at the tip of electrically conducting materials, microlight detectors if the conductors in the channels are covered with photodetecting materials, microlight sources if the channels of conducting material are coated with electroluminescent materials, multiple channel fountain pens, multiple channel tips for multiple electrochemical and/or optical measurements, micro heating elements, stable micro devices for annealing, soldering, cutting, etc., Peltier microcooling devices, microdynamic cavitation bubble forming devices, generating devices with two isolated electrodes with appropriate electrical inputs, etc. In the past, some of these applications were attempted with single channel devices with less than successful results. For example, microthermocouples with force sensing capabilities have been previously described using a tip that is produced with silicon technology that is then combined with coating procedures to effect a point thermocouple or thermoresistor at the tip of a cantileveied structure. Nonetheless, these coating techniques are very susceptible to the destruction of the point contact at the tip when such tips are employed in contact with a sample surface. The newly invented techniques described in this patent avoid such problems and also allow the production of new structures that were not permitted by such previous technology [C. Prater and T. B. Albrecht, Universal Microfabricated Probe for Scanning Probe Microscopes, U.S. Pat. No. 5,166,520] that was based on some sort of combination of etching or coating rather than the forming procedures used and possible in this invention.

III STATE OF PRIOR ART

There has been no approach that has been used in the past that would allow the production of the structures described in this patent. Thus, both in terms of the methodology that is described and the type of structures and the devices that can be obtained this is a significant invention over the state of prior art.

IV SUMMARY OF THE INVENTION

The invention is a method to produce a type of probe based on multiple channels of isolated materials that can, if so desired, be cantilevered. The structures and the variety of applications that they provide are a result of the ability of these devices to sense surface forces and thus permit the control of these probes at or above specified surfaces in order to accomplish specific applications.

V BRIEF DESCRIPTION OF THE DRAWINGS

The foregoing, and additional objects, features and advantages of the invention will become apparent to those of skill in the art from the following detailed description of preferred embodiments thereof, taken with the accompanying drawings, in which.

VI DESCRIPTION OF THE INVENTION

Figure 1:
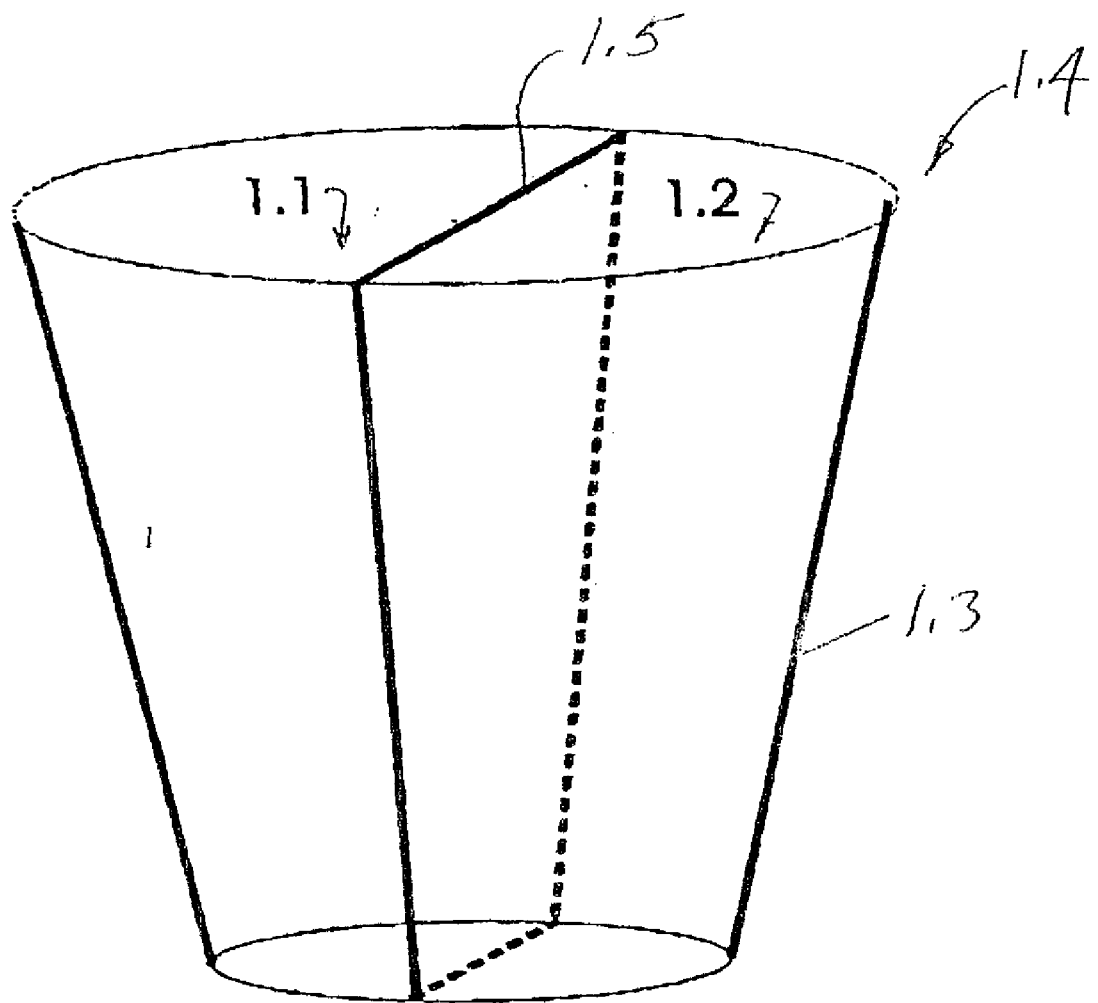
FIG. 1 illustrates an example of a multiple channel tapered structure that is part of this invention.
Figure 2:
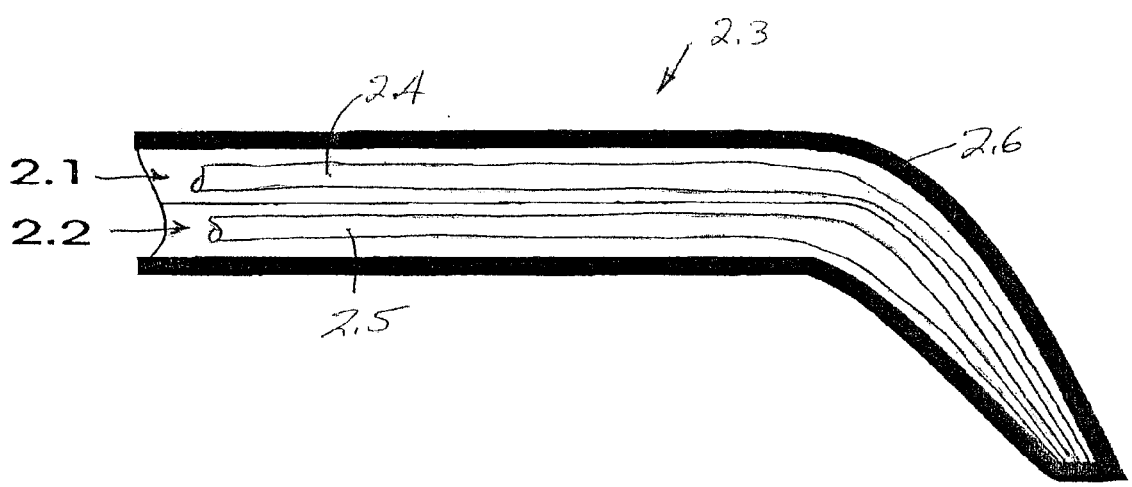
FIG. 2 illustrates a structure similar to FIG. 1 which is cantilevered.
Figure 3:
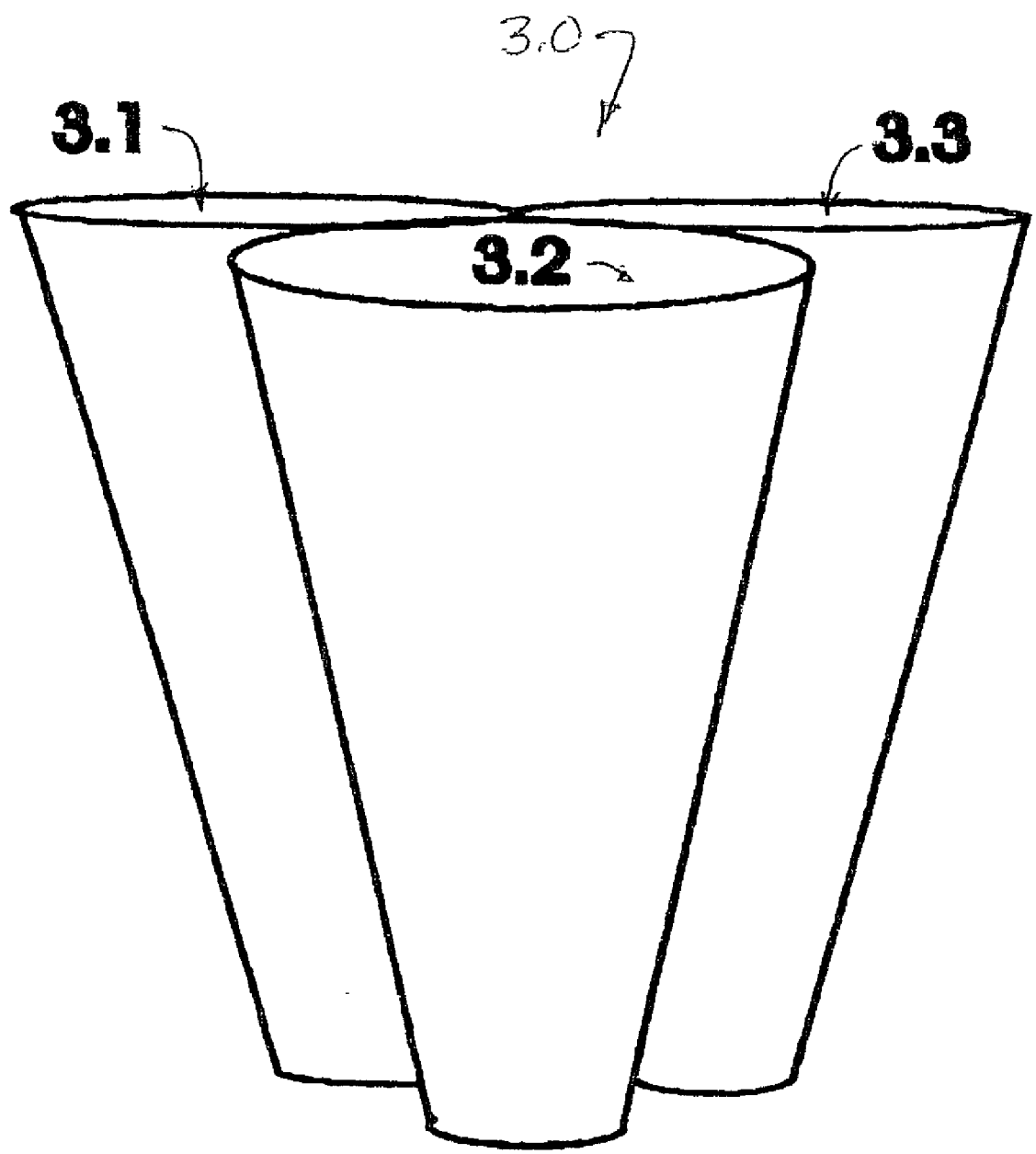
FIG. 3 illustrates another example of a multichannel structure as described herein.

The invention is a general method and the resulting devices in which multiple channels (1.1 and 1.2) in FIG. 1 can be formed into a tapered (illustrated at 1.3) or untapered structure (1.4) such that two or more materials (solid, liquid or gas) of either the same or different chemical composition are isolated from one another by a solid material, or till, (1.5) in the tip of the structure. At this tip the two materials can either be connected or left unconnected, depending on the application that is desired. Such structures can have force constants both as straight or cantilevered devices (see FIG. 2 with channels 2.1 and 2.2 in a cantilevered, tapered structure 2.3) that allow for force sensing applications. In addition to the two channel devices shown in FIG. 1, multiple channels can also be produced that mix many of the attributes that are described above. An example of such a tapered structure (3.0) is shown in FIG. 3, where three multiple channels are illustrated at 3.1, 3.2 and 3.3 in a straight (non-cantilevered) emulation. Nonetheless, this does not limit these structures to three channels and such structures can be made with more than three channels. Furthermore, the three channel structures and structures with additional channels can be cantilevered as shown in FIG. 2.

As only one example of such a force sensing multiple device structure, we have produced, using theta glass capillaries, a two-wire cantilevered structure that can be used for thermal resistance when the two isolated materials are metal and of the same composition, and can be used as a thermocouple or a Peltier cooler when the two materials are of different metallic composition. This was accomplished using glass forming technology in which a multiple channel glass capillary such as that illustrated in FIG. 2, with a metal wire (2.4 and 2.5) in each channel (2.1 and 2.2, respectively) is pulled under heating, tension and cooling that is microprocessor controlled. The two channels together with two metal wires in the channels produce a structure that has two tapered wires isolated by glass that can be either left straight or can be cantilevered.

Figure 4:
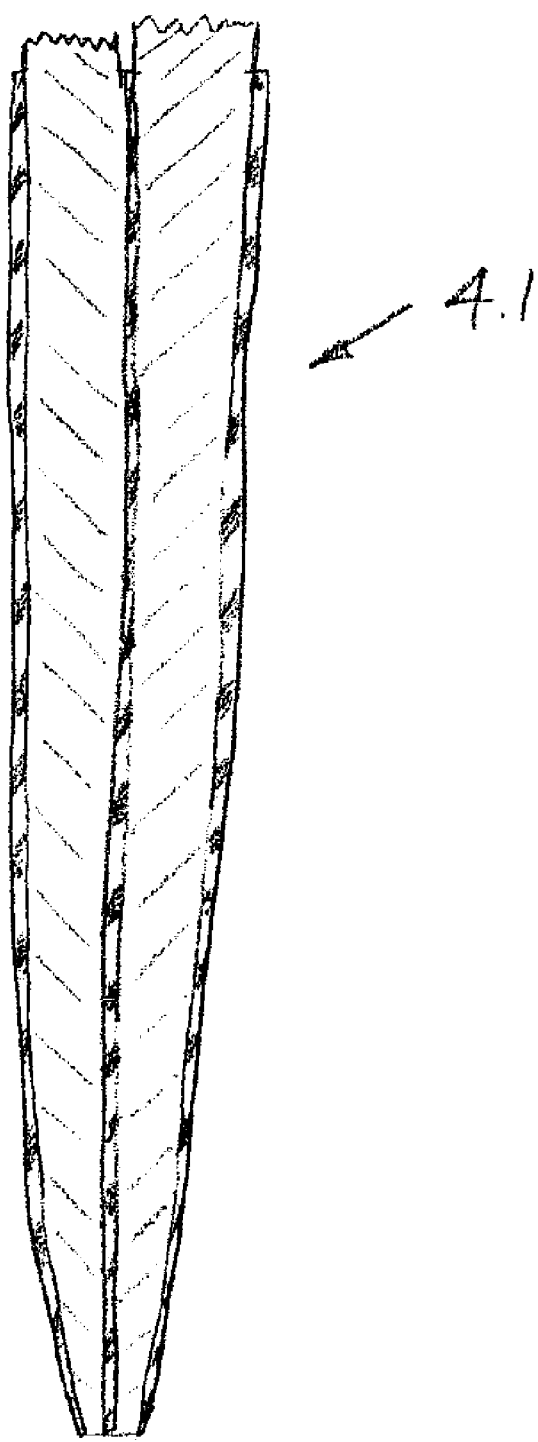
FIG. 4 illustrates an example of a structure produced by the glass forming technology approach described herein.

In order to produce such a structure, it is important to choose the condition of tapering such that when the tapering is accomplished by heating, combinations of symmetry and asymmetry of the structures are chosen in order to provide the best results for the specific device that is going to be produced. An example of such a tapered multiple wire structure (4.1) is shown in FIG. 4. In this structure the size of the tip is 100 nanometers. However, such structures can be made from many tens of millimeters to single nanometers and can also be coated with metallic material (2.6 in FIG. 2) on the outside surface of the multiple channels. Furthermore, for specific applications, such as a micro vacuum devices which have not been produced previously, it is possible to use the same technology to produce a single channel vacuum device using a capillary in which there is only one channel. Finally, all such devices can be produced with a mirror deposited on the tip in order to allow for specific techniques of force sensing.

The above does not limit the method of producing such structures since procedures based on micro electro mechanical (MEMs) techniques could also be applied to produce such tapered structures with force sensing capabilities. When these techniques are applied, it is important to choose the conditions depending on the structure in order that the distance between the two channels after tapering is appropriate to the device that is being produced.

VII ADVANTAGES OVER PRIOR ART

The availability of such multiple isolated force sensing channels provides a whole new arena of devices that can be applied in many areas of science and technology. In many instances it provides for new capabilities that are not available today, and in other areas it greatly improves the flexibility and reliability of some applications that can be accomplished with significant difficulty.

VIII APPLICATIONS

With this invention, numerous applications are now possible or can be significantly improved. For example, these structures could act as probes that could have multiple attributes such as chemical sensors in one channel with gas in another channel, can be micro vacuum devices with a single channel that could suck up materials and air and a second channel to release such materials, can be unique nanometric thermocouples, thermoresistors, micro voltage, micro capacitance, micro inductive, and micromagnetic devices, depending on electrical isolation or contact at the tip of electrically conducting materials, can be microlight detectors if the conductors in the channels are covered with photodetecting materials, microlight sources if the channels of conducting material are coated with electroluminescent materials, multiple channel fountain pens, multiple channel tips for multiple electrochemical and/or optical measurements, micro heating elements, can be stable micro devices for annealing, soldering, cutting, etc., or can be Peltier microcooling devices, microdynamic cavitation bubble forming devices, micro plasma generating devices with two isolated electrodes with appropriate electrical inputs, etc. In the past, some of these applications were attempted with single channel devices with less than successful results. Such a list is, of course, not exhaustive and various applications will now be possible with the availability of such devices.

What is claimed is:

1. A method to produce a multichannel device comprising:
   locating within a glass capillary at least two different materials of either the same or different chemical composition isolated from one another by a solid material till;
   heating and pulling said capillary to produce a force sensing tip having a tapered structure that can have a size of 1,000 microns to single nanometers, wherein the materials can either be connected or left unconnected at the tip depending on the application that is desired.

2. A method as in claim 1 in which the two different materials are metallic materials chosen for thermal resistance or thermocouple or microinducive or micromagnetic applications.

3. A method as in claim 1 in which the two different materials are metallic materials chosen for micro heating or micro cooling Peltier applications.

4. A method as in claim 1 in which the two different materials are metallic wires chosen for microvoltage or micro current or micro resistance or micro capacitance application.

5. A method as in claim 1 in which one of the two different materials is an electrochemical sensor while the other is an optical sensor.

6. A method as in claim 1 in which said at least two materials deliver at least two chemical species for reaction at the tip of the structure.

7. A method to produce a multichannel device, comprising:
   locating within a longitudinal cavity in a glass capillary a till dividing the cavity into at least two longitudinal isolated channels;
   heating and pulling said capillary to produce a tip having a tapered structure with a diameter of between about 1,000 microns and one nanometer in which at least one of said channels is left free for the passage of chemicals.

8. A method as in claim 7, further including applying a vacuum to one channel in order to vacuum or lift particles while applying a positive pressure to another channel to release particles.

9. A method as in claim 7, further including locating in at least one channel a metallic wire or an optical fiber or a sensing material.

10. A method as in claim 7, further including locating a material in at least a second of said at least two channels.

11. A method as in claim 7, further including locating electrically conductive material in at least two of said channels and depositing appropriate materials for light production or detection on an exterior surface of said channels.

12. A method as in claim 7, in which the tip can be as large as millimeters without force sensing attributes.

13. A method as in claim 7, further including depositing metallic coatings on the outside of said device.

14. A method as in claim 7, further including forming a mirror on said device to allow lateral force sensing schemes to be employed.

15. A multichannel device, comprising:
   an elongated glass capillary having a tapered end portion and incorporating an internal cavity opening at a tip end;
   a solid till within said capillary cavity and dividing the cavity into first and second isolated channels, said channels extending within the cavity to said tip end;
   said tapered end portion being tapered to a size from tens of microns to single nanometers; and
   different materials of either the same or different chemical composition located in said first and second channels and isolated from one another by said solid till said materials being connectable at the tip end.

16. A device as in claim 15, which said two materials are metallic and are chosen for thermal resistance or thermocouple or microinducive or micromagnetic applications.

17. A device as in claim 15 in which said two materials are metallic and are chosen for micro heating or micro cooling Peltier applications.

18. A device as in claim 15, in which said two different materials are metallic wires chosen for microvoltage or micro current or micro resistance or micro capacitance applications.

19. A device as in claim 15, in which said two different materials include an electrochemical sensor in said first channel and an optical sensor in said second channel.

20. A multichannel device comprising:
an elongated glass capillary incorporating an internal cavity, said capillary and its internal cavity having a tapered end portion with an opening at a tip end, said end portion being tapered to a size from tens of microns to single nanometers;
at least one solid till within the capillary cavity dividing the cavity into multiple isolated elongated channels extending through said end portion, said multiple channels being open at the tip of the tapered end portion.

21. A device as in claim 20, in which one channel is left free for the passage of chemicals and including a metallic wire or an optical fiber or a sensing material in at least another channel.

22. A device as in claim 20, further including a vacuum in one channel in order to vacuum or lift particles and a positive pressure in another channel to release particles.

23. A device as in claim 20, in which said multiple channels are formed to make a micro soldering, annealing and/or cutting devices.

24. A device as in claim 20, further including electrically conductive material in at least two of said multiple channels and a layer of light producing or light detecting material on surfaces of said multiple channels to provide a micro electroluminescent or micro photodetecting device.

25. A device as in claim 20, further including means in said channels for producing cavitation bubbles by microheating liquid that surrounds said device.

26. A device as in claim 25 in which the tip can be as large as millimeters without force sensing attributes.

27. A device as in claim 20, further including means in said channels for producing microplasma in surrounding materials.

28. A device as in claim 27 in which the tip can be as large as millimeters without force sensing attributes.

29. A device as in claim 20, further including combinations of materials inserted into said multiple channels.

30. A device as in claim 20, further including metallic coatings deposited on the outside of the structure.

31. A device as in claim 20, further including a mirror on a surface of said multiple channel device to allow for lateral force sensing schemes to be employed.

* * * * *